United States Patent
Lee (10) Patent No.: US 9,351,573 B2
(45) Date of Patent: May 31, 2016

(54) EASEL

(71) Applicant: Jong-Moon Lee, Incheon (KR)

(72) Inventor: Jong-Moon Lee, Incheon (KR)

(73) Assignee: Jong-Moon Lee, Incheon (KR)

( * ) Notice: Subject to any disclaimer, the term of this patent is extended or adjusted under 35 U.S.C. 154(b) by 0 days.

(21) Appl. No.: 14/398,457

(22) PCT Filed: Apr. 15, 2013

(86) PCT No.: PCT/KR2013/003146
§ 371 (c)(1),
(2) Date: Nov. 1, 2014

(87) PCT Pub. No.: WO2014/017728
PCT Pub. Date: Jan. 30, 2014

(65) Prior Publication Data
US 2015/0108315 A1    Apr. 23, 2015

(30) Foreign Application Priority Data
Jul. 5, 2012  (KR) .................. 10-2012-0081049

(51) Int. Cl.
*A47B 97/04*  (2006.01)
*A47B 97/08*  (2006.01)
*F16M 11/34*  (2006.01)

(52) U.S. Cl.
CPC .............. *A47B 97/08* (2013.01); *A47B 97/04* (2013.01); *F16M 11/34* (2013.01)

(58) Field of Classification Search
CPC .............................. A47B 97/04; A47B 97/08
USPC ............. 248/441.1, 449, 444, 454, 460, 462, 248/463, 464, 465, 166, 168, 170
See application file for complete search history.

(56) References Cited

U.S. PATENT DOCUMENTS 1,517,825 A * 12/1924 Bruneau ................ F16M 11/34
                                                   248/171
3,304,045 A *  2/1967 Bethoney ............... A47B 97/08
                                                   248/170
3,759,482 A *  9/1973 Wright .................. A47B 97/08
                                                   248/449

(Continued)

FOREIGN PATENT DOCUMENTS

JP    H08228874 A    9/1996
KR    20-0187274 Y1  7/2000
KR    20-0315002 Y1  6/2003

OTHER PUBLICATIONS

International Search Report for PCT/KR2013/003146.

*Primary Examiner* — Todd M Epps
(74) *Attorney, Agent, or Firm* — The PL Law Group, PLLC (57) ABSTRACT

The present invention relates to an easel allowing the angle of inclination thereof to be adjusted and reliably maintaining the adjusted angle of inclination, the easel comprising: a main bracket; expandable front supports rotatably attached on both sides of the front of the main bracket; an expandable rear support rotatably attached to the back of the main bracket; a supporting platform, both sides of which are detachably coupled to the front supports; a raising-and-lowering bar attached on the front center of the main bracket so as to allow raising and lowering of same, and the lower end of which is vertically slidably supported by the supporting platform; and a tilting unit, rotatably and expandably coupled in between the rear support and the front support platform, for controlling the angle of inclination of the rear support with respect to the front supports.

9 Claims, 9 Drawing Sheets

(56) References Cited

U.S. PATENT DOCUMENTS

| | | | | |
|---|---|---|---|---|
| 6,206,183 B1 * | 3/2001 | Helsel | ............... | A47B 97/08 206/1.7 |
| 6,601,805 B1 * | 8/2003 | Kapp | ............... | A47B 97/08 248/171 |
| 7,293,753 B1 * | 11/2007 | Kapp | ............... | A47B 97/08 248/170 |
| 7,722,007 B2 * | 5/2010 | Stengel | ............... | A47B 97/08 248/176.1 |
| 8,146,871 B1 * | 4/2012 | Kulp | ............... | G09F 15/0062 248/168 |
| 9,220,343 B2 * | 12/2015 | Selwa | ............... | A47B 97/04 |

* cited by examiner

EASEL

FIELD OF THE INVENTION

The present invention relates to an easel, and more particularly, to an easel allowing for adjustment of a tilt angle as desired and enabling to reliably maintain an adjusted tilt angle.

BACKGROUND OF THE INVENTION

Easels are generally used to hold drawing boards, photographs, pictures, menu blackboards, signboards, or the like to allow many people to view them.

Such easels usually include three support frames provided on both sides and at the center, a drawing board prop coupled to the front of the support frames, and a rear support frame coupled to the rear of the central support frame, among the three support frames, by means of a folding member.

Further, in the drawing board prop, after coupling bolts are led into the two support frames on both sides and the drawing board prop, coupling nuts are fastened to the coupling bolts.

Thus, the drawing board prop is used after the central support frame is lifted or lowered to fit the height of a user and fastened.

However, these general easels have a structure that the rear support frame supports the entirety of a load of painting materials including a canvas, or the like held on the drawing board prop with respect to the two support frames on both sides.

Thus, the rear support frame may fail to tolerate the load of the painting materials, opened with respect to the two support frames on both sides, to cause the easel to collapse.

SUMMARY OF THE INVENTION

It is, therefore, an object of the present invention to provide an easel allowing for adjustment of a tilt angle as desired and enabling to reliably maintain an adjusted tilt angle.

In accordance with the invention, there is provided~

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with the accompanying drawings.

Figure 1:
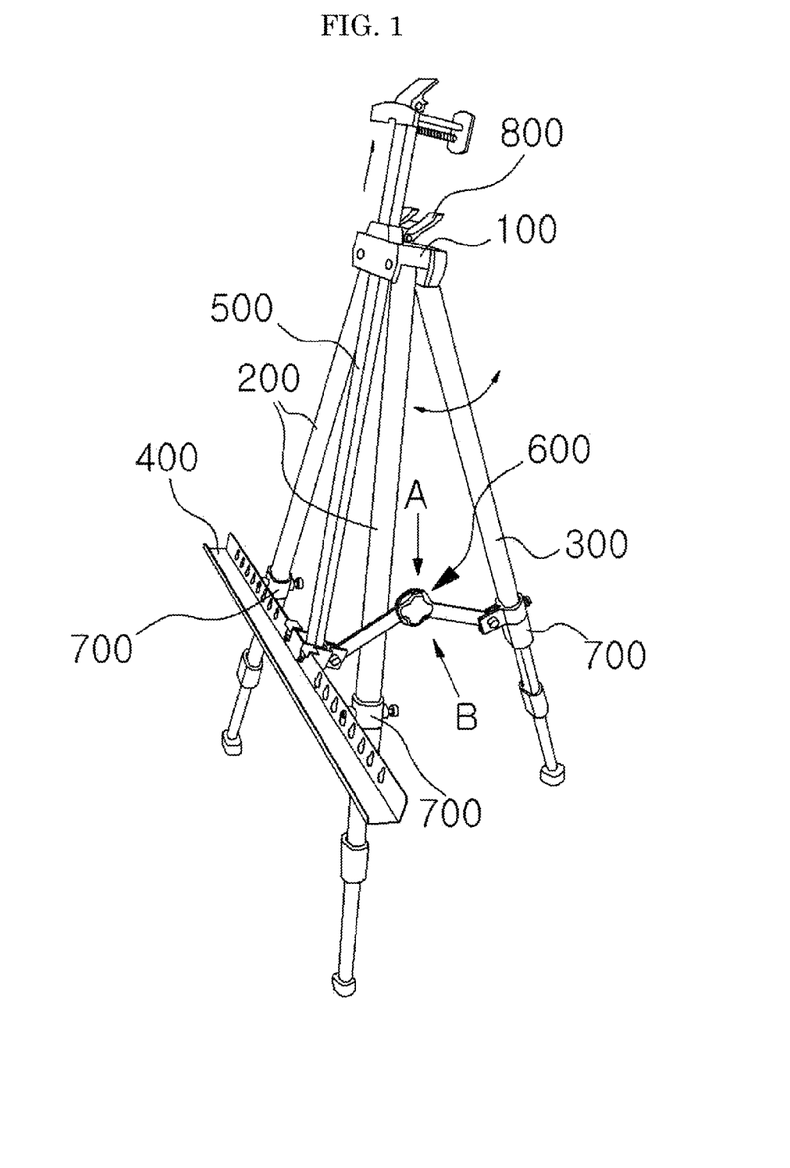
FIGS. 1 and 2 are perspective views illustrating an overall structure and an operational state of an easel according to an embodiment of the present invention.
Figure 2:
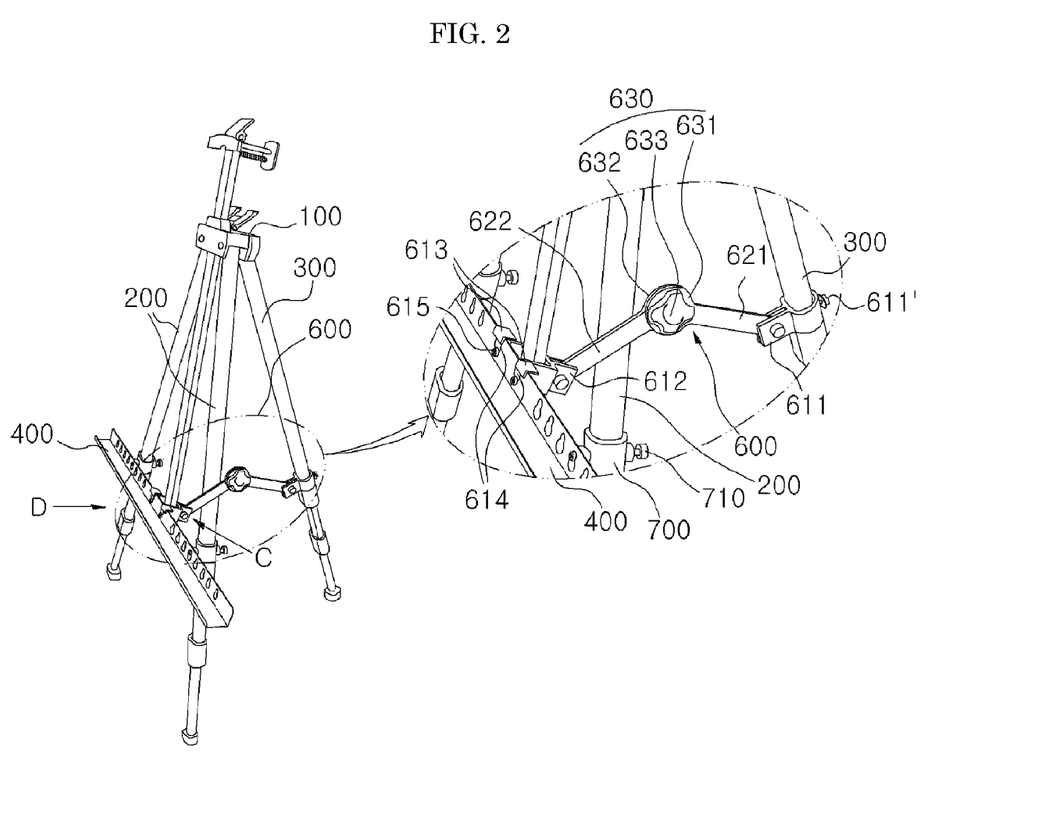

FIGS. 1 and 2 are perspective views illustrating an overall structure and an operational state of an easel according to an embodiment of the present invention.

As illustrated, it can be recognized that the present invention has a structure that front supports 200 and a rear support 300 are rotatably coupled to a main bracket 100, a prop 400 is coupled to the front supports 200, a lift 500 ascends and descends between the front supports 200 through the main bracket 100, and a tilting unit 600 is coupled between the rear support 300 and the prop 400 to adjust a tilt angle.

For reference, unexplained reference numeral 700 in FIGS. 1 and 2 denote a support clamp for stretching and fixing the front and rear supports 200 and 300, and reference numeral 710 denotes a fixture.

Further, unexplained reference numeral 800 indicated by the dotted line in the main bracket 100 in FIGS. 1 and 2 denotes an upper clamp for fixing a lift position of the lift 500 after adjusting the lift position.

The main bracket 100 is disposed in an upper portion of the easel according to an embodiment of the present invention to provide a rotation space of the front and rear supports 200 and 300 and a reciprocating space of the lift 500.

The front supports 200 are rotatably installed on both sides of the front of the main bracket 100 and stretchable, and support a load of painting materials such as a canvas at the front.

The rear support 300 is rotatably installed in the rear of the main bracket 100 and stretchable, and distributedly supports a load of the painting materials such as a canvas together with the front supports 200 at the rear.

The prop 400 is detachably coupled to the front supports 200 on both sides thereof and allows a lower edge portion of the canvas to be mounted thereon for painting materials such as a canvas to be mounted with a cross-section having a shape of "⌐", "⌐ -", or "ㄷ", providing convenience such that an operator may work.

The lift 500 is installed at the center of the front side of the main bracket 100 such that it ascends and descends, and a lower end thereof is supported by the prop 400. Although not shown particularly, a fixture may be disposed at an upper end of the lift 500 to face the prop 400, and the lift 500 may be appropriately lifted depending on the size of painting materials such as a canvas to fix the painting materials between the fixture and the prop 400.

The tilting unit 600 is rotatably and stretchably coupled between the rear support 300 and the prop 400 to adjust a tilt angle of the rear support 300 with respect to the front supports 200. When adjustment of a tilt angle is completed, the tilting unit 600 serves to fixedly maintain a tilt angle maintenance state of the rear support 300.

In the present invention, it will be understood that the foregoing embodiment may be applied and various embodiments as follows may also be applied.

As described above, it can be recognized that the tilting unit 600 adjusts a tilt angle of the rear support 300 with respect to the front supports 200 and has a structure that includes first and second auxiliary brackets 611 and 612, first and second rotational pieces 621 and 622, and a pivot assembly.

The first auxiliary brackets 611 is coupled to the rear support 300 and connected to the first rotational piece 621, and the second auxiliary bracket 612 is coupled to the prop 400 and connected to the second rotational piece 622.

Here, the first auxiliary bracket 611 further includes a bracket fixing screw 611' as shown in the enlarged part of FIG. 2, and an end portion of the bracket fixing screw 611' is screw-coupled through the first auxiliary bracket 611 so as to be fixedly in contact with the rear support 300, thus preventing the first auxiliary bracket 611 from running idle or moving with respect to the rear support 300.

In this case, one end portion of the first rotational piece 621 is rotatably coupled to the first auxiliary bracket 611, and one end portion of the second rotational piece 622 is rotatably coupled to the second auxiliary bracket 612.

Further, the pivot assembly connects the other end portions of the first and second rotational pieces 621 and 622 to rotate the other end portions of the first and second rotational pieces 621 and 622 such that an angle can be adjusted, various embodiments of which will be described below in more detail.

Figure 3:
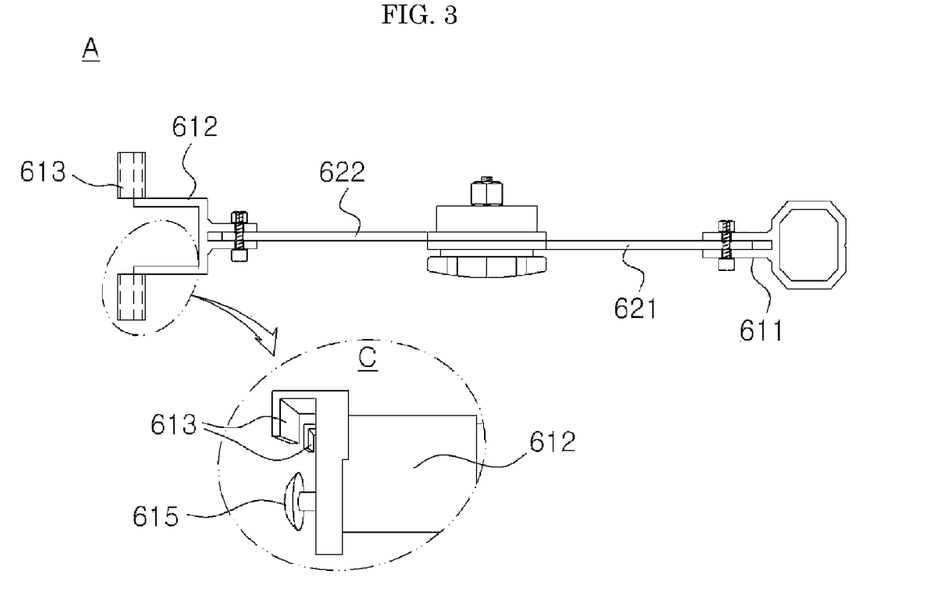
FIG. 3 is a conceptual view viewed from a point 'A' in FIG. 1.

Also, as illustrated in the enlarged part of FIG. 2 and FIG. 3, the second auxiliary bracket 612 further has a release preventing bracket 613 having a wedge shape of " ⌐ " or " ⌐ " fixing edges of the upper end portion of the prop 400.

Further, the release preventing bracket 613 is fixed to an upper portion of the prop 400 by a fixing bolt 615 through a fixing hole 614 as illustrated in FIGS. 4 to 7.

The prop 400 will be described in detail. A plurality of adjustment holes 401 are formed at equal intervals on both sides of the prop 400 in a length direction such that the prop 400 is fixed by a bolt 701 in respective appropriate positions with the pair of front supports 200, and a pair of fixing holes 614 are provided in a central portion of the prop 400 to fix the fixing bolt 615.

Here, a lower portion of each of the adjustment holes 401 has a width greater than that of the upper portion of each of the adjustment holes 401, and thus, a screw portion of the bolt 701 passes from the narrow upper portion and a head of the bolt 701 is fixedly in contact with the relatively wide lower edge.

In contrast, an upper portion of each of the fixing holes 614 has a width greater than a lower portion of each of the fixing holes 614, and thus, a screw portion of the fixing bolt 615 passes from the narrow lower portion and a head of the fixing bolt 614 is fixedly in contact with the relatively wide upper edge.

It will be understood that structural shapes of the adjustment holes 401 and the fixing holes 614 may be variously applied and designed; that is, conversely, the adjustment holes 401 are formed such that an upper portion thereof is wider than a lower portion thereof and the fixing holes 614 are formed such that a lower portion is wider than an upper portion thereof.

Figure 7:
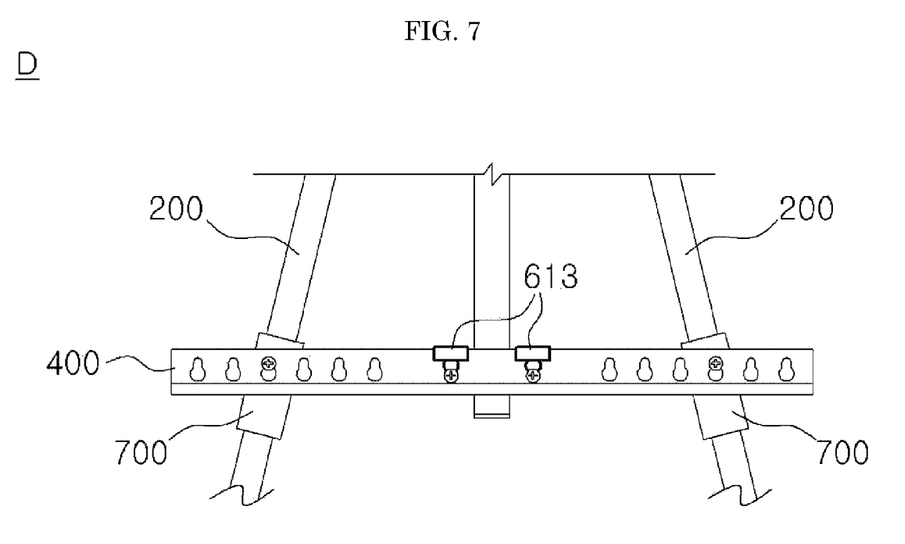

When the adjustment holes 401 and the fixing holes 614 are formed to be reversed in their structural shapes as described above, the bolt 701 is pushed down so as to be fixed and the fixing bolt 614 is pushed up so as to be fixed, thus maintaining the upper and lower edges of the prop 400 in a firmly fixed state by the fixing bolt 615 and the bolt 701 together with the release preventing bracket 613 as illustrated in FIG. 7.

Then, the process of fastening the prop 400 will be described briefly as follows.

Figure 4:
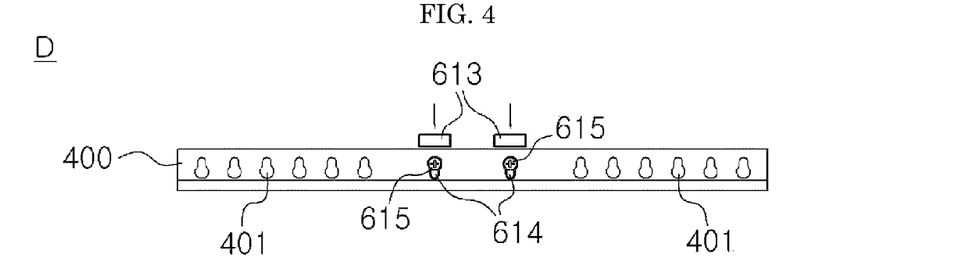
FIGS. 4 to 7 are conceptual views sequentially illustrating a procedure of fixing a prop as a major part of the easel to a front support, as viewed from a point 'D' in FIG. 2, according to an embodiment of the present invention.
Figure 5:
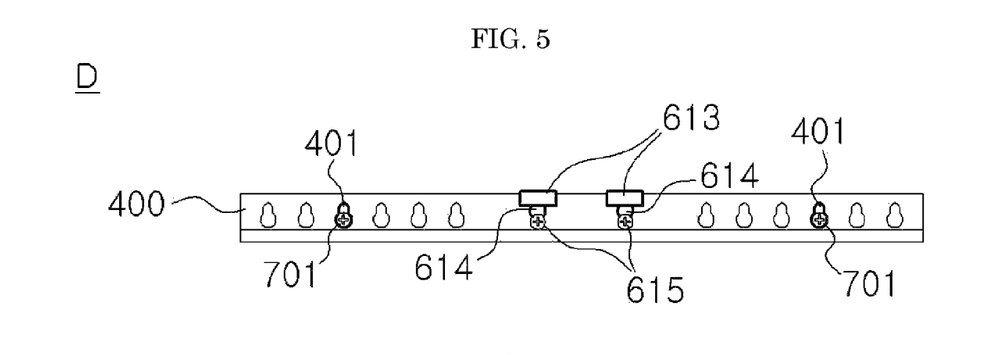

First, when a user inserts the fixing bolt 615 from the wide side of the fixing hole 614 and pushes down the release preventing bracket 613 in the arrow direction as shown in FIG. 4, the release preventing bracket 613 pushed down together with the fixing bolt 615 comes into contact with an upper edge of the prop 400 as shown in FIG. 5, the fixing bolt 615 is installed, and the release preventing bracket 613 is then tightly fixed to the prop 400.

Figure 6:
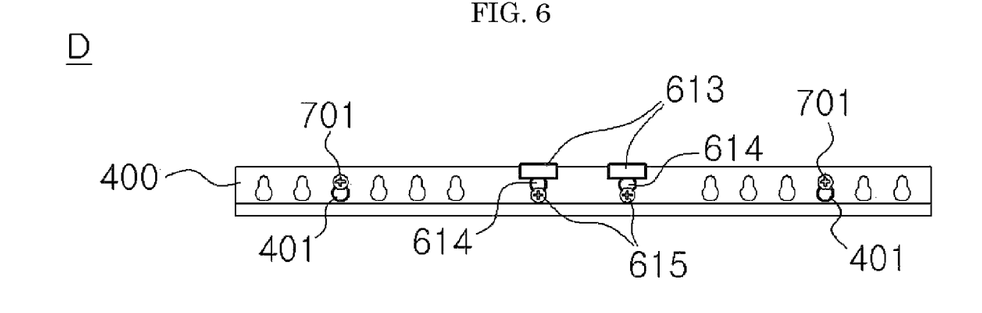

Next, the user appropriately adjusts an angle of the front supports 200, inserts a bolt 701 into the adjustment hole 401 in an appropriate position, and then pushes up the bolt 701 to install it (in this case, the clamps 700 for supporting the rear of the support 400 (see FIG. 7) are also adjusted in position) as shown in FIG. 6. Then, the prop 400 is firmly tightly fixed by the upper release preventing bracket 613, the lower bolt 701, and the rear supporting clamps 700 as shown in FIG. 7.

Figure 8:
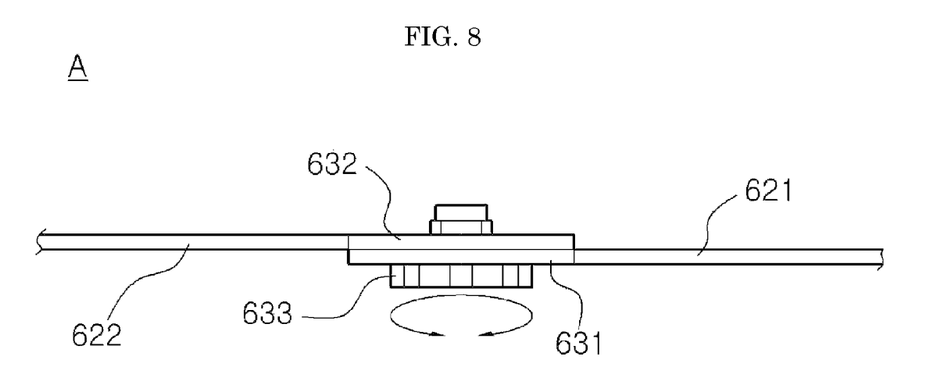
FIGS. 8 to 15 are conceptual views illustrating a structure and an operational state of a tilting unit as a major part of the easel according to various embodiments of the present invention.

Meanwhile, as shown in FIGS. 1, 2, and 8, it can be recognized that the pivot assembly 630 includes a first rotary member 631 extending from the other end portion of the first rotational piece 621, a second rotary member 632 rotating in contact with the first rotary member 631 and extending from the other end portion of the second rotational piece 622, and a fixed piece 633 screw-coupled through the first and second rotary members 631 and 632 and having a handle formed in an end portion thereof.

Specifically, the user may grasp the fixed piece 633 and rotate the same in a direction opposite the screw-coupled direction to release a coupled state to allow the first and second rotary members 631 and 632 to freely rotate from each other, and then, the user may form a tilt angle of the rear support 300 with respect to the front supports 200 as desired, such as the states of FIGS. 1 and 2, and subsequently rotate the fixed piece 633 to lock it, maintaining the tilt angle.

Figure 9:
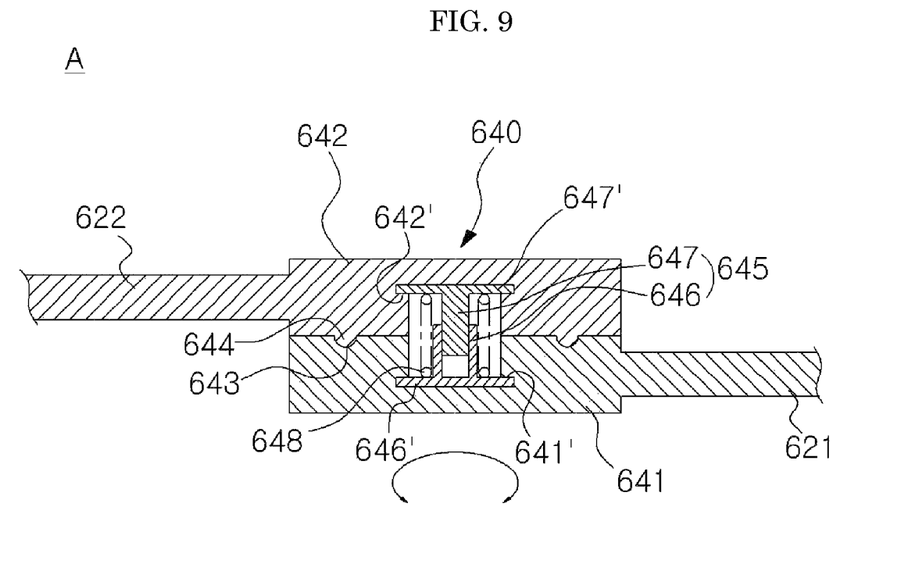
Figure 10:
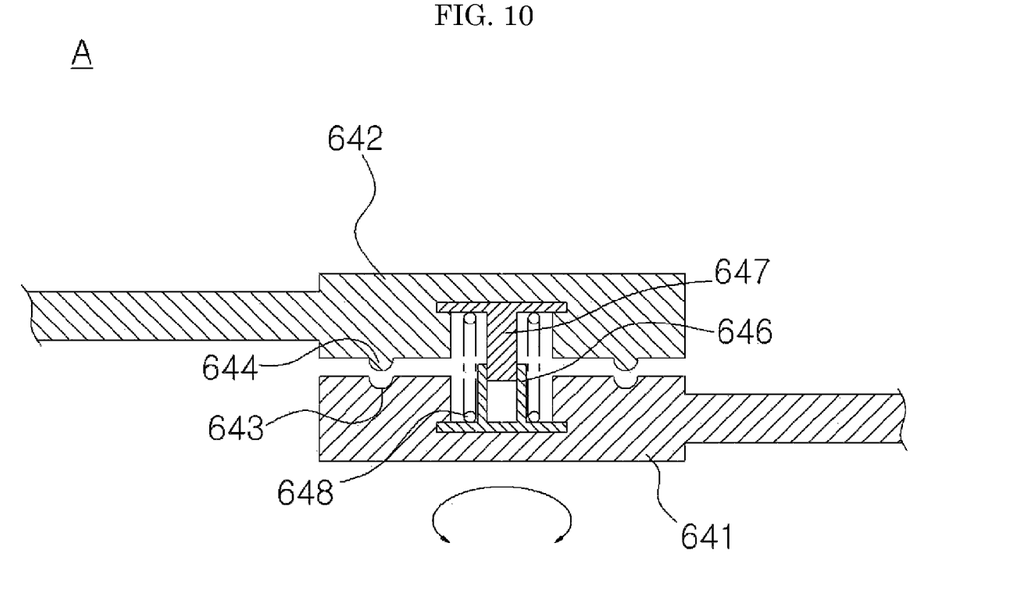

Further, as illustrated in FIGS. 9 and 10, in the pivot assembly 640, a tilt angle may be adjusted by a mutual contact coupling structure of contact recesses 643 and contact protrusions 644 between first and second rotary members 641 and 642.

Specifically, the pivot assembly 640 includes the first rotary member 641 extending from the other end portion of the first rotational piece 621 and the second rotary member 642 rotating in contact with the first rotary member 641 and extending from the other end portion of the second rotational piece 622. Here, the hemispherical contact recesses 643 are formed at equal intervals on a contact surface of the first rotary member 641 in contact with the second rotary member 642, and the hemispherical contact protrusions 644 are formed at equal intervals on a contact surface of the second rotary member 642 in contact with the first rotary member 641.

Here, the pivot assembly 640 includes a cylinder 645 protruding from the first rotary member 641 and the second rotary member 642 and allowing rotation, separately from rotation of the first and second rotary members 631 and 632, wherein the cylinder 645 is stretchable.

This is because a spring 648 to be described later may be twisted to be damaged or deformed if the cylinder 645 rotates in conjunction with the first and second rotary members 641 and 642.

As illustrated, the cylinder 645 includes a cylinder body 646 protruding from a central portion of the first rotary member 641 and a rod 647 protruding from a central portion of the second rotary member 642, and the rod 647 contracts or stretches in an overall length as it insertedly enters or exits the cylinder body 646.

Thus, as illustrated, the cylinder 645 includes the rod 647 protruding from the second rotary member 642 with respect to the cylinder body 646 protruding from the first rotary member 641 so as to insertedly enter or exit the cylinder body 646, and here, preferably, the cylinder body 646 and the rod 647 have flanges 646' and 647' to rotate with respect to the first and second rotary members 641 and 642, respectively.

Here, an edge of the flange 646' of the cylinder body 646 is caught by a step 641' provided at an inner side of the first rotary member 641 so as to be prevented from being released, and an edge of the flange 647' of the rod 647 is caught by a step 642' provided at an inner side of the second rotary member 642 so as to be prevented from being released.

Further, it will be understood that the cylinder body 646 and the rod 647 may be modified and designed to have a reverse structure of the illustrated structure, that is, the cylinder body 646 may be provided in the second rotary member 642 and the rod 647 may be provided in the first rotary member 641.

In this case, the pivot assembly 640 includes a spring 648 having both end portions fixed to an outer circumferential surface of the cylinder 645, i.e., to an end portion of the cylinder body 646 and an end portion of the rod 647, respectively, to elastically support the cylinder 645 in a contracted direction.

Thus, when the user wants to adjust the tilt angle of the rear support 300 with respect to the front supports 200 little by little, as illustrated in FIG. 9, the user may adjust the tilt angle little by little in stages by mutually rotating the first and second rotary members 641 and 642 in a mutually contacted state.

Further, when the user wants to significantly adjust the tilt angle of the rear support 300 with respect to the front supports 200 or wants to completely fold to be received, as illustrated in FIG. 5, the user may separate the second rotary member 642 from the first rotary member 641 and significantly rotate the second rotary member 642 to adjust the tilt angle.

Figure 11:
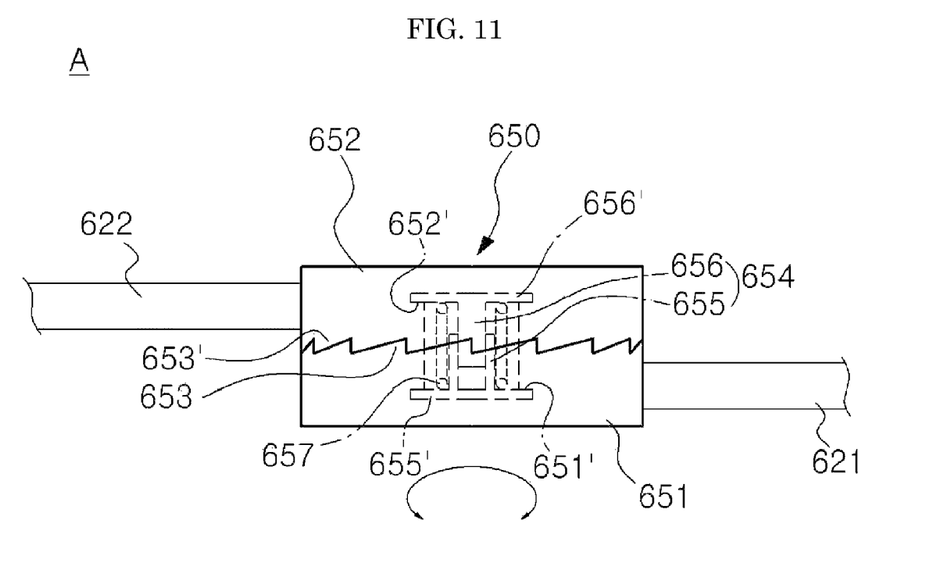
Figure 12:
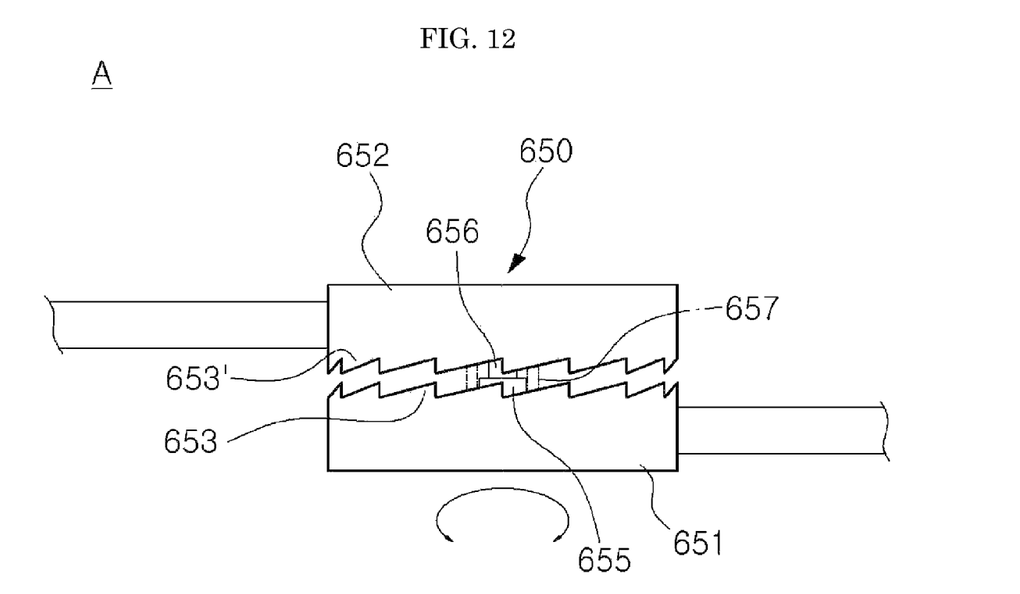

Meanwhile, as illustrated in FIGS. 11 and 12, a pivot assembly 650 may also have a ratchet structure in which sawteeth 653 and 653' between first and second rotary members 651 and 652 are engaged, allowing rotation only in one direction but preventing rotation in another direction, to adjust the tilt angle and temporarily maintain a firmly fastened state.

That is, the sawteeth 653 and 653' are formed at equal intervals on the surface in which the first and second rotary members 651 and 652 are in contact, and sloped in one direction.

Further, a cylinder 654 protrudes from the first rotary member 651 and the second rotary member 652, allows rotation separately from rotation of the first and second rotary members 651 and 652, and is stretchable.

This is because a spring 657 to be described later may be twisted to be damaged or deformed if the cylinder 654 rotates in conjunction with the first and second rotary members 651 and 652.

As illustrated, the cylinder 654 includes a cylinder body 655 protruding from a central portion of the first rotary member 651, and a rod 656 protruding from a central portion of the second rotary member 652, and the rod 656 contracts or stretches in an overall length as it insertedly enters or exits the cylinder body 655.

Thus, as illustrated, the cylinder 654 includes the rod 656 protruding from the second rotary member 652 with respect to the cylinder body 655 protruding from the first rotary member 651 so as to insertedly enter or exit the cylinder body 655, and here, preferably, the cylinder body 655 and the rod 656 have flanges 655' and 656' to rotate with respect to the first and second rotary members 651 and 652, respectively.

Here, an edge of the flange 655' of the cylinder body 655 is caught by a step 651' provided at an inner side of the first rotary member 651 so as to be prevented from being released, and an edge of the flange 656' of the rod 656 is caught by a step 652' provided at an inner side of the second rotary member 652 so as to be prevented from being released.

Further, it will be understood that the cylinder body 655 and the rod 656 may be modified and designed to have a reverse structure of the illustrated structure, that is, the cylinder body 655 may be provided in the second rotary member 652 and the rod 656 may be provided in the first rotary member 651.

In this case, the pivot assembly 650 includes a spring 657 having both end portions fixed to an outer circumferential surface of the cylinder 654, i.e., to an end portion of the cylinder body 655 and an end portion of the rod 656, respectively, to elastically support the cylinder 654 in a contracted direction.

Thus, when the user wants to adjust the tilt angle of the rear support 300 with respect to the front supports 200 little by little, as illustrated in FIG. 11, the user may rotate the first and second rotary members 651 and 652 in a mutually contacted state in mutually opposite directions to allow the sawteeth 653 and 653' in mesh to slide on the sloped surfaces sloped to be lopsided in one direction, respectively, thus adjusting the tilt angle little by little in stages.

Further, when the user wants to significantly adjust the tilt angle of the rear support 300 with respect to the front supports 200 or wants to completely fold to be received, as illustrated in FIG. 5, the user may separate the second rotary member 652 form the first rotary member 651 and significantly rotate the second rotary member 652 to adjust the tilt angle.

Figure 13:
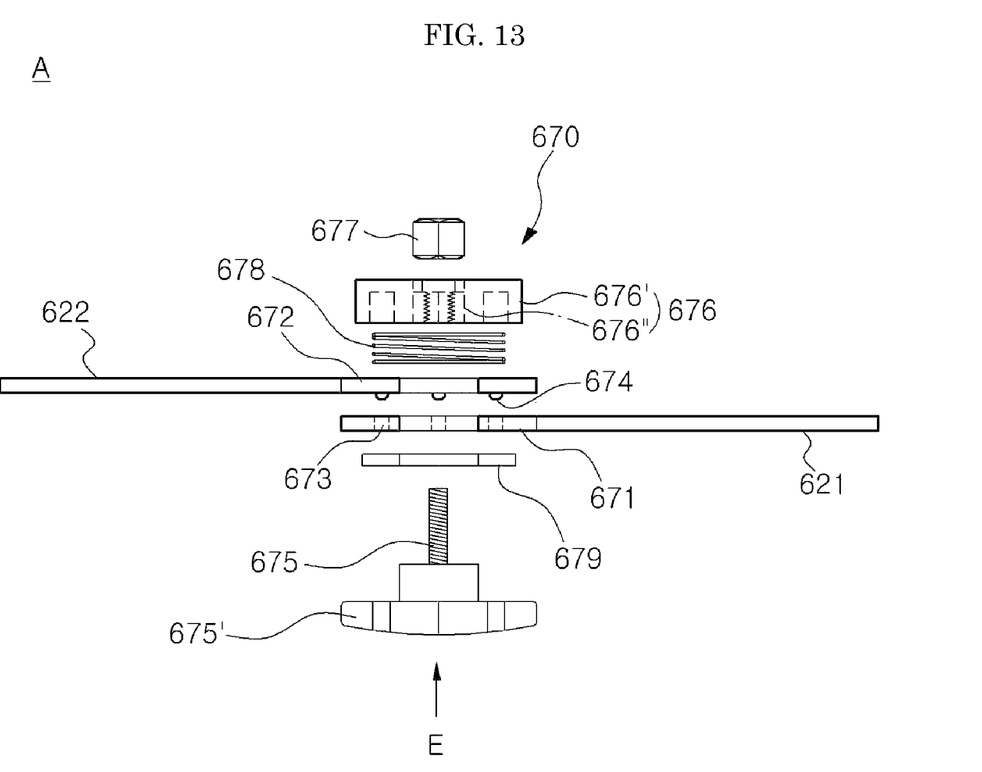
Figure 14:
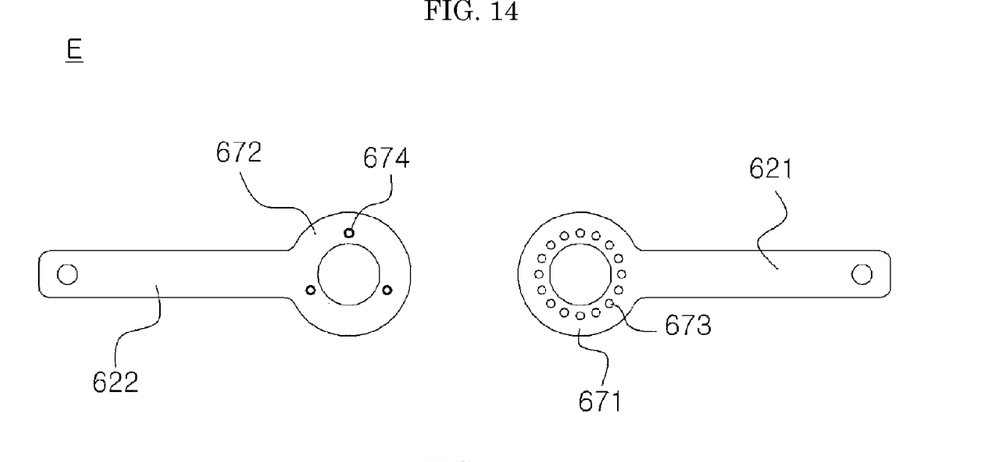

Meanwhile, as illustrated in FIGS. 13 and 14, it will be understood that a pivot assembly 670 may have a structure allowing a mutual rotational contact of first and second rotary members 671 and 672 each having contact holes 673 and contact protrusions 674 between a central shaft 675 and a bearing casing 676.

For reference, unexplained reference numeral 679 denotes a washer.

The first rotary member 671 extends from the other end portion of the first rotational piece 621 and the second rotary member 672 rotates in contact with the first rotary member 671 and extends from the other end portion of the second rotational piece 622.

The contact holes 673 penetrate through a contact surface of the first rotary member 671 in contact with the second rotary member 672 at equal intervals, and the contact protrusions 674 are formed on a contact surface of the second rotary member 672 in contact with the first rotary member 671 at equal intervals and disposed in a position corresponding to the contact holes 673, wherein the contact protrusions 674 have a hemispherical shape.

The central shaft 675 penetrates through central portions of the first and second rotary members 671 and 672 with the contact protrusions 674 in contact with the contact holes 673, so as to be screw-coupled, and a handle 675' provided in one end portion thereof is in contact with an outer side of any one of the first and second rotary members 671 and 672.

The bearing casing 676 is a container-shaped member allowing the central shaft 675 to penetrate therethrough so as to be screw-coupled, and in contact with an outer side of the remaining of the first and second rotary members 671 and 672.

A screw release preventing nut 677 is screw-coupled to the other end portion of the central shaft 675 penetrating to be exposed from the central portion of the bearing casing 676.

A spring 678 is installed in the bearing casing 676, allows the central shaft 675 to penetrate a central portion thereof, and elastically supports the bearing casing 676 in a direction away from the first and second rotary members 671 and 672.

Here, it can be recognized that the bearing casing 676 includes a container-shaped casing body 676' opened toward the first and second rotary members 671 and 672 and a both-side penetrative bearing 676" protruding toward the first and second rotary members 671 and 672 from the center of the casing body 676' and having a thread formed on an inner circumferential surface thereof to allow the central shaft 675 to penetrate and be screw-coupled therein.

In this case, the spring 678 is disposed between an outer circumferential surface of the bearing 676" and an inner circumferential surface of the casing body 676'.

Thus, when the user wants to adjust a tilt angle of the rear support 300 with respect to the front supports 200 little by little, the user may rotate the handle 675' in a direction in which the central shaft 675 is released with respect to the screw release preventing nut 677 in a state in which the first and second rotary members 671 and 672 are in contact, to release the tightly attached state of the first and second rotary members 671 and 672 to form a small gap therebetween.

In this case, even though the first and second rotary members 671 and 672 are allowed to have a gap therebetween, the first and second rotary members 671 and 672 are maintained in a mutually tightly attached state due to elastic repulsive power of the spring 678.

Thereafter, when the user rotates the first and second rotary members 671 and 672 in mutually opposite directions, the contact protrusions 674 insertedly positioned in the contact holes 673 are inserted into other contact holes 673 spaced apart by a predetermined interval in stages, thereby adjusting the tilt angle little by little.

Meanwhile, even in a state in which the tilt angle is adjusted by the pivot assemblies 630, 640, and 650 of the tilting unit 600 according to various embodiments described above, the tilt angle of the rear support 300 needs to be more finely adjusted with respect to the front supports 200.

Figure 15:
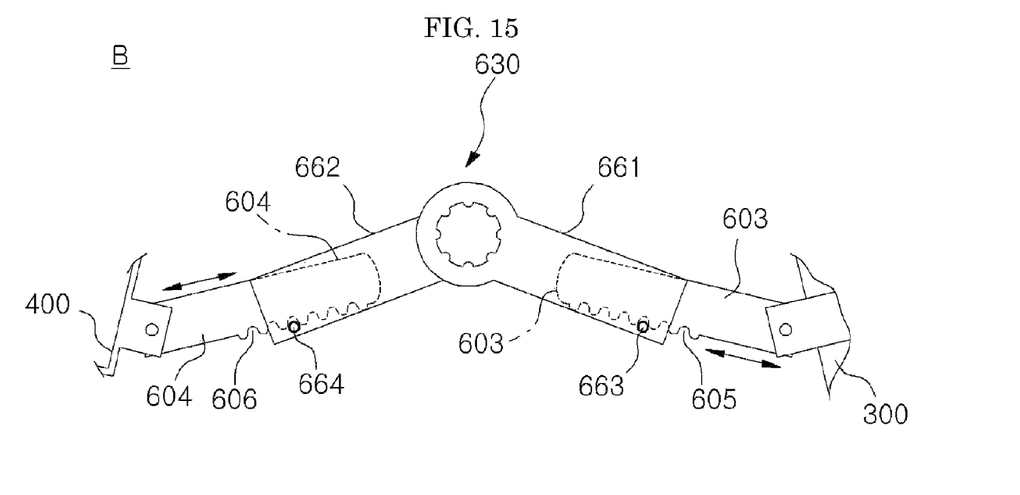

Thus, the tilting unit 600 may have a structure allowing third and fourth rotational pieces 603 and 604 to enter and exit first and second container bodies 661 and 662 extending to both sides based on the pivot assembly 630, 640, or 650 as illustrated in FIG. 15 (In FIG. 5, it will be understood that the pivot assembly 630 of FIG. 8 is applied, and the pivot assemblies 640 and 650 according to the other embodiments may also be applied).

That is, the tilting unit 600 includes the third rotational piece 603 rotatably coupled to the rear support 300 and the fourth rotational piece 604 rotatably coupled to the prop 400.

Further, the tilting unit 600 includes the first container body 661 forming an internal space in which the third rotational piece 603 is accommodated and coupled such that it enters and exits, and the second container body 662 forming an internal space in which the fourth rotational piece 604 is accommodated and coupled such that it enters and exits.

Thus, the pivot assembly 630 connects the end portions of the first and second container bodies 661 and 662 and rotates the end portions of the first and second container bodies 661 and 662 to adjust an angle.

In addition, the tilting unit 660 further includes positioning pins 663 and 664 penetratingly coupled to the first and second container bodies 661 and 662, respectively, and positioning recesses 605 and 606 formed at equal intervals on one edges of the third and fourth rotational pieces 603 and 604 and having a shape corresponding to an outer circumferential surface of the positioning pins 663 and 664.

Thus, the tilting unit 600 allows the third and fourth rotational pieces 603 and 604 to enter and exit in a length direction of the first and second container bodies 661 and 662, respectively, thus finely adjusting the tilt angle of the rear support 300 with respect to the front supports 200.

As described above, according to the present invention, the easel enabling a tilt angle to be adjusted as desired and reliably maintain an adjusted tilt angle can be provided.

According to the present invention having the configuration as described above, a stable structure can be obtained by the tilting unit which is rotatably and stretchably coupled between the rear support and the prop, adjusts a tilt angle of the rear support with respect to the front supports according to various embodiments such as the contact recesses and the contact protrusions or the sawteeth structure, and maintains an adjusted tilt state.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An easel, comprising:
  a main bracket;
  front supports rotatably installed on both sides of a front of the main bracket, the front supports being contractible and stretchable;
  a rear support rotatably installed in a rear of the main bracket, the rear support being contractible and stretchable;
  a prop detachably coupled to the front support on both sides thereof;
  a lift installed in a center of the front of the main bracket such that the lift ascends and descends and having a lower end portion supported by the prop; and
  a tilting unit including a first rotational piece having one end portion rotatably coupled to a first auxiliary bracket coupled to the rear support, a second rotational piece having one end portion rotatably coupled to a second auxiliary bracket coupled to the prop, and a pivot assembly connecting the other end portions of the first and second rotational pieces and rotating the other end portions of the first and second rotational pieces in order to adjust a tilt angle, wherein a tilt angle of the rear support with respect to the front supports is adjusted.

2. The easel of claim 1, wherein the pivot assembly comprises:
  a first rotary member extending from the other end portion of the first rotational piece;
  a second rotary member rotating in contact with the first rotary member and extending from the other end portion of the second rotary member; and
  a fixed piece screw-coupled through the first and second rotary members and having a handle formed in an end portion thereof.

3. The easel of claim 1, wherein the pivot assembly comprises:
  a first rotary member extending from the other end portion of the first rotational piece;
  a second rotary member rotating in contact with the first rotary member and extending from the other end portion of the second rotary member;
  hemispherical contact recesses formed at equal intervals on a contact surface of the first rotary member in contact with the second rotary member;
  hemispherical contact protrusions formed at equal intervals on a contact surface of the second rotary member in contact with the first rotary member;
  a cylinder protruding from the first rotary member and the second rotary member and allowing rotation, separately from the rotation of the first and second rotary members, the cylinder being stretchable; and
  a spring having both end portions thereof fixed to an outer circumferential surface of the cylinder and elastically supporting the cylinder in a contracted direction.

4. The easel of claim 1, wherein the pivot assembly comprises:

a first rotary member extending from the other end portion of the first rotational piece;

a second rotary member rotating in contact with the first rotary member and extending from the other end portion of the second rotary member;

sawteeth formed at equal intervals on the surface in which the first and second rotary members are in contact, and sloped in one direction;

a cylinder protruding from the first rotary member and the second rotary member and allowing rotation, separately from the rotation of the first and second rotary members, the cylinder being stretchable; and a spring having both end portions thereof fixed to an outer circumferential surface of the cylinder and elastically supporting the cylinder in a contracted direction.

5. The easel of claim 1, wherein the pivot assembly comprises:

a first rotary member extending from the other end portion of the first rotational piece;

a second rotary member rotating in contact with the first rotary member and extending from the other end portion of the second rotary member;

hemispherical contact holes penetratingly formed on a contact surface of the first rotary member in contact with the second rotary member at equal intervals;

hemispherical contact protrusions formed on a contact surface of the second rotary member in contact with the first rotary member at equal intervals and disposed in a position corresponding to the contact holes;

a central shaft penetrating central portions of the first and second rotary members with the contact protrusions in contact with the contact holes, so as to be screw-coupled and having a handle provided in one end portion thereof, the handle being in contact with an outer side of any one of the first and second rotary members;

a container-shaped bearing casing allowing the central shaft to penetrate therethrough to be screw-coupled and disposed to be in contact with an outer side of the other of the first and second rotary members;

a screw release preventing nut screw-coupled with the other end portion of the central shaft penetratingly exposed from the central portion of the bearing casing; and a spring installed in the bearing casing, allowing the central shaft to penetrate through a central portion thereof, and elastically supporting the bearing casing in a direction away from the first and second rotary members.

6. The easel of claim 5, wherein the bearing casing comprises:

a container-shaped casing body opened toward the first and second rotary members; and a both-side penetrative bearing protruding from the center of the casing body toward the first and second rotary members and having a thread formed on an inner circumferential surface thereof, and penetrating the central shaft so as to be screw-coupled therein, wherein the spring is disposed between an outer circumferential surface of the bearing and an inner circumferential surface of the casing body.

7. The easel of claim 1, wherein the tilting unit comprises:

a third rotational piece rotatably coupled to the rear support;

a fourth rotational piece rotatably coupled to the prop;

a first container body forming an internal space allowing the third rotational piece to be accommodated and enter and exit;

a second container body forming an internal space allowing the fourth rotational piece to be accommodated and enter and exit; and a pivot assembly connecting end portions of the first and second container bodies and rotating the end portions of the first and second container bodies to adjust a tilt.

8. The easel of claim 7, wherein the tilting unit comprises:

positioning pins penetratingly coupled to the first and second container bodies, respectively; and positioning recesses formed at equal intervals on one edges of the third and fourth rotational pieces and having a shape corresponding to an outer circumferential surface of the positioning pins.

9. The easel of claim 1, wherein the tilting unit further comprises:

a release preventing bracket extending from both sides of the front of the second auxiliary bracket and disposed to be in contact with the upper edges of the prop; and a fixing bolt screw-coupled through a fixing hole penetrating a central portion of the prop so as to be fixed to the second auxiliary bracket.

\* \* \* \* \*